(12) United States Patent
Wakabayashi et al.

(10) Patent No.: US 8,777,471 B2
(45) Date of Patent: Jul. 15, 2014

(54) ELECTRONIC EQUIPMENT PROVIDED WITH DISPLAY PORTION

(75) Inventors: Takeshi Wakabayashi, Kyoto (JP); Kazuto Ishida, Kusatsu (JP)

(73) Assignee: OMRON Corporation, Kyoto-shi (JP)

( * ) Notice: Subject to any disclaimer, the term of this patent is extended or adjusted under 35 U.S.C. 154(b) by 278 days.

(21) Appl. No.: 13/381,010

(22) PCT Filed: Mar. 23, 2011

(86) PCT No.: PCT/JP2011/056910
§ 371 (c)(1),
(2), (4) Date: Feb. 9, 2012

(87) PCT Pub. No.: WO2012/120698
PCT Pub. Date: Sep. 13, 2012

(65) Prior Publication Data
US 2012/0230052 A1    Sep. 13, 2012

(30) Foreign Application Priority Data
Mar. 8, 2011   (JP) ................................. 2011-050850

(51) Int. Cl.
*F21V 7/04*       (2006.01)
(52) U.S. Cl.
USPC .............................. 362/602; 362/607; 362/613
(58) Field of Classification Search
USPC ............................ 362/23, 602, 607, 613, 97.3
See application file for complete search history.

(56) References Cited

U.S. PATENT DOCUMENTS

2007/0008451 A1    1/2007   Tanaka

FOREIGN PATENT DOCUMENTS

| JP | 08-313907 A | 11/1996 |
|---|---|---|
| JP | 2003-037370 A | 2/2003 |
| JP | 2005-077892 A | 3/2005 |
| JP | 2006-047391 A | 2/2006 |
| JP | 2006-285171 A | 10/2006 |
| JP | 2007-179751 A | 7/2007 |
| JP | 2008-263145 A | 10/2008 |
| JP | 2010-002484 A | 1/2010 |
| JP | 2010-114073 A | 5/2010 |

OTHER PUBLICATIONS

Supplementary European Search Report dated Apr. 4, 2014, for Appl. No. 11794617.8-1904.

*Primary Examiner* — Vip Patel
(74) *Attorney, Agent, or Firm* — Marvin A. Motsenbocker; Mots Law, PLLC

(57) ABSTRACT

An LCD indicator unit contains an LCD indicator with a display portion that includes set temperature and current temperature display portions, a diffusion sheet disposed on the rear surface side of the LCD indicator, a reflective frame body disposed on the rear surface side of the diffusion sheet, a light guide plate disposed on the rear surface side of the reflective frame body such that an outer peripheral portion thereof is covered with the reflective frame body, and an LCD indicator control substrate-disposed on the rear surface side of the light guide plate, with LEDs serving as light sources for the LCD indicator mounted on a right-side outer peripheral portion on the front surface side of the LCD indicator control substrate. Light emitted from the LEDs is caused to enter a side wall surface portion of the light guide plate to irradiate the display portion of the LCD indicator.

8 Claims, 5 Drawing Sheets

ELECTRONIC EQUIPMENT PROVIDED WITH DISPLAY PORTION

TECHNICAL FIELD

The present disclosure relates to electronic equipment provided with a display portion such as a temperature controller, a timer, or a digital panel meter.

BACKGROUND ART

One type of electronic equipment is, for example, a temperature controller where the temperature of an item, serving as the object of the temperature control, is controlled by turning ON or OFF the power source of a heater used for heating the object of the temperature control. The heating is performed in relation to a predetermined control temperature set for the object of the temperature control.

Such a temperature controller is configured using a plurality of electronic components installed and used in a control panel or the like on the side of an external device. The temperature controller accommodates a control board configuring a control unit for controlling the external device, a terminal to be electrically connected to the external device, and the like in an electronic equipment casing. Among temperature controllers, a known type is one provided with a display portion configured to dispose an LCD indicator unit on the front portion side of an electronic equipment casing so as to display a heating target temperature and a current temperature of a heat plate or the like in the indicator (refer to Patent Document 1 to Patent Document 3).

A temperature controller type widely used is one in which an LCD indicator unit is adopted as the display portion for a downsizing of the entire structure of the temperature controller and improvement of the display function. Such an LCD indicator unit is required to have an LCD indicator disposed in a front surface portion of the electronic equipment casing for displaying the target temperature and the current temperature, and have backlight means for radiating a back surface of the LCD indicator with backlight. Due to this, the temperature controller provided with the display portion is configured to accommodate such a LED display unit and the backlight means in the electronic equipment casing.

A backlight module such as described in Patent Document 4, for example, could be used as the backlight means for radiating the back surface of the LCD indicator. However, such a backlight module requires an electric connection, such as made by thermo-compression and soldering of a flexible substrate, a mount pin, and the like for providing an electric interface, and an increase in assembling man-hour and a rise in the cost of parts are unavoidable.

Thus, this type of conventional temperature controller provided with the display portion has for example a structure shown in FIG. 1. That is, in FIG. 1, in a temperature controller 1 serving as the electronic equipment, a display region portion 6a is exposed as a display portion of an LCD indicator 6 for displaying a set temperature value and the like and operation buttons 3 for operating a control unit and the like are disposed in a front surface portion of the electronic equipment casing 2. The control unit described later and the like are accommodated in the electronic equipment casing 2.

As shown in FIG. 7, this type of conventional temperature controller 1 has the electronic equipment casing 2 formed of a front case 2a and a rear case 2b. In a front surface portion of the front case 2a, a display window 2a-1 formed of an opened window, a closed window closing the opened window with transparent resin, and the like is provided, and a display window cover 4 formed into a frame shape or having a display window portion made of transparent resin is attached. A support frame body 2a-2 is formed so as to extend on the rear portion side of the front case 2a. In the support frame body 2a-2 are a display sheet 5 having a center portion formed as an opened window, a closed window closing the opened window with transparent resin, and the like, the LCD indicator 6 having the display region portion 6a on a front surface, a diffusion sheet 7, a reflective plate 8, and an LCD indicator control substrate 9 in which LEDs 9a serving as backlight sources for the LCD indicator 6 and a control circuit for performing LCD drive control, temperature adjustment control, and the like are mounted, and are successively fitted and disposed side by side from the back surface side of the front surface portion of the front case 2a to the rear side. The LCD indicator 6 and the LCD indicator control substrate 9 provide the electric interface via a pair of upper and lower rubber connectors 11 disposed in the front case 2a. An LCD indicator unit 10 is configured by the LCD indicator 6, the diffusion sheet 7, the reflective plate 8, and the LCD indicator control substrate 9 having the LEDs 9a, and possibly including the rubber connectors 11 and the display sheet 5.

Further, the rear case 2b has a box shape in which a front surface portion and a rear surface portion are opened. A terminal base 12 to be electrically connected to an external device is installed in a rear opening in a protruding manner, and a control unit substrate group 13 for controlling the external device via the terminal base 12 is accommodated inside. In the rear case 2b, the LCD indicator unit 10 is accommodated and installed so as to provide an electric interface with the control unit substrate group 13.

The temperature controller 1 configured in such a way is installed in a control panel or the like installed in a factory or the like. By operating the operation buttons 3 provided in the front surface portion of the front case 2a, the set temperature is digitally displayed in a set temperature display portion 6a-1 in the display region portion 6a of the LCD indicator 6 (refer to FIG. 1). At the same time, a current temperature indicating a heating state of an item serving as an object of temperature control in the external device, such as a heater operated based on such a set temperature, is digitally displayed in a current temperature display portion 6a-2 in the display region portion 6a.

Digital display of the set temperature display portion 6a-1 and the current temperature display portion 6a-2 in the display region portion 6a is performed by control of the LCD indicator control substrate 9 disposed on the rear portion side of the LCD indicator 6, with the LCD indicator control substrate 9 similarly configuring the LCD indicator unit 10, or the like. That is, in the LCD indicator unit 10, an operation signal of the operation buttons 3 is firstly received by the LCD indicator control substrate 9. The set temperature is digitally expressed by the LCD indicator 6, and displayed characters of the set temperature display portion 6a-1 in the display region portion 6a are transparently displayed by illumination of the LEDs 9a, so that the set temperature is digitally displayed. Similarly, in a case where the current temperature signal indicating the heating state of the item in the external device is received by the LCD indicator control substrate 9 via the control unit substrate group 13, the current temperature is digitally expressed by the LCD indicator 6, and the displayed characters are similarly transparently displayed by the illumination of the LEDs 9a in the current temperature display portion 6a-2 of the display region portion 6a, so that the current temperature is digitally displayed.

In such a way, in order to make the LCD indicator 6 clearly display the set temperature and the current temperature in the display region portion 6a, the temperature controller 1 is required to include backlight means for illuminating a rear surface of the LCD indicator 6. Therefore, the LEDs 9a are mounted on the LCD indicator control substrate 9 so as to face a digital display portion of the display region portion 6a in the LCD indicator 6. A light beam of the LEDs 9a applied by lighting of the LEDs 9a is diffused by the diffusion sheet 7 so as to spread over the entire display region portion 6a, while preventing diffusion to an exterior of the display region portion 6a by the reflective plate 8. The LCD indicator 6 displays the generated digital display in the display region portion 6a, so that a user can visually recognize it.

PRIOR ART DOCUMENT

Patent Document

Patent Document 1: Japanese Unexamined Patent Publication No. 2003-37370
Patent Document 2: Japanese Unexamined Patent Publication No. 2005-77892
Patent Document 3: Japanese Unexamined Patent Publication No. 2008-263145
Patent Document 4: Japanese Unexamined Patent Publication No. 2010-2484

SUMMARY OF THE INVENTION

Problems to be Solved by the Invention

Considering that the temperature controller 1 is installed in the control panel on the side of the external device, due to a usage demand, an outer shape of the electronic equipment casing 2 is limited to 24 mm square, 32 mm square, 48 mm square, 72 mm square, and 96 mm square, and there is a tendency that a depth as small as possible is preferred to minimize any reduction of the installation space. The temperature controller 1 with such a limitation on the outer shape is required to have an internal structure downsized as much as possible even in the case where functions and performance are to be improved. Therefore, the LEDs 9a mounted on the LCD indicator control substrate 9 and the LCD indicator 6 are unavoidably installed close to each other. As a result, a radiated light of the LEDs 9a becomes a spot light relative to the LCD indicator 6.

Therefore, even when the displayed characters of the display region portion 6a are illuminated with the light beam emitted from the LEDs 9a as backlight via the diffusion sheet 7 and the reflective plate 8, the characters displayed in the display region portion 6a have a brightness and darkness that are not uniform in terms of illumination intensity in some parts. Thus a user of the temperature controller, when looking at the display region, is not able to easily visually recognize the displayed characters because the numbers are displayed with this lack of uniformity in the brightness and the darkness in which some parts are bright and other parts are dark.

In order to avoid such a situation, it is supposed that the LEDs 9a having a brightness with a high light intensity are used. However, when the LEDs 9a have a brightness with high light intensity, a radiated light range becomes a narrower spot light. As a result, it is thought that a diffusion sheet 7 with an enhanced diffusion property be used between the LCD indicator 6 and the LEDs 9a in order to provide a more uniform amount of light to the entire LCD indicator 6.

However, in a case where the diffusion property is enhanced in the diffusion sheet 7, light transmissibility is conversely lowered. Thus, the average light amount of the LEDs 9a to the LCD indicator 6 is reduced. Moreover, in order to make the diffusion sheet 7 have a structure in which the diffusion property is enhanced, the diffusion sheet is configured by overlapping a plurality of sheets, but this results in the light transmissibility being lowered. Thus, cost of the diffusion sheet 7 is increased, and a measure for increasing the average light amount to the LCD indicator 6 and a measure for reducing the spot light are in a trade-off relationship. Therefore, adjustment for both the measures is accompanied by a difficulty in design.

A balance between an increase in the average light amount applied to the LCD indicator 6 by the LEDs 9a and a reduction of the spot light effect becomes a restricting condition relative to each other. The number of the LEDs 9a to be mounted on the LCD indicator control substrate 9 is unavoidably increased as an LCD area of the LCD indicator 6 is extended in proportion to this. That is, LEDs having a high brightness with a high light intensity cannot be used, so that the number of the LEDs to be used is not easily reduced. As a result, the number of the LEDs to be used is increased. Particularly, in a case where the LCD indicator 6 is large-sized, the influence of using an increased number of LEDs is large, and the restricting condition for balancing the increase in the average light amount and the reduction of the spot light effect becomes more severe. Furthermore, an increase in the number of the LEDs to be used unavoidably becomes a bottleneck of an object of reducing the cost and decreasing an electric power amount by reducing the number of parts including a drive circuit of the LEDs 9a.

A measure to extend the distance between the LEDs 9a mounted on the LCD indicator control substrate 9 and the LCD indicator 6, so to move the LCD indicator 6 away from the LEDs 9a serving as light sources in order to reduce the spot light effect, results in an increased size in the thickness direction of the reflective plate 8. Thus a result of such a measure is that downsizing, as an important accomplishment condition of the temperature controller 1, is contradicted.

Therefore, an object of an embodiment is to provide an electronic equipment provided with a display portion such as a temperature controller that is capable of achieving an increase in an average light amount radiated to an LCD indicator by LEDs and a reduction of a spot light effect at the same time, while also sufficiently responding to a demand for downsizing.

Means for Solving the Problem

Electronic equipment provided with a display portion according to an aspect of this invention is configured to accommodate an LCD indicator unit in an electronic equipment casing formed of a front case and a rear case, and to dispose the display portion of the LCD indicator unit to be exposed from a front opening provided in the front case, wherein the LCD indicator unit is configured to have an LCD indicator provided with the display portion, a diffusion sheet disposed on a rear surface side of the LCD indicator, a reflective frame body disposed on a rear surface side of the diffusion sheet, a light guide plate disposed on a rear surface side of the reflective frame body such that an outer peripheral portion thereof is covered with the reflective frame body, and an LCD indicator control substrate disposed on a rear surface side of the light guide plate, and is configured such that an LED as a light source for the LCD indicator is mounted on an outer peripheral portion of the LCD indicator control substrate, and light emitted from the LED is caused to enter a side wall surface portion of the light guide plate to radiate the display portion of the LCD indicator.

According to the aspect of this invention, a light beam of the LED mounted on the outer peripheral portion of the LCD indicator control substrate is caused to enter from the side of the side wall surface portion of the light guide plate, and then is guided to the side of a light guide surface portion of the light guide plate facing the diffusion sheet and is led to the side of the LCD indicator, to radiate the display portion. As a result, a reaching radiation distance of the light beam emitted by the LED to the display portion is extended, so that a spot light effect can be reduced. Thus, the thin diffusion sheet having high transmissibility with an advantage in terms of cost can be adopted. Therefore, this aspect can reduce the number of the LEDs to be used by using LEDs having a high brightness with a high light intensity, and as a result, downsizing of the entire device is achieved, and further assembly man-hour is consequently reduced.

In the above aspect, a light refracting portion made of a grain, a dot, or the like may be formed in a surface portion of the light guide plate facing the LCD indicator control substrate.

According to such a configuration, in a case where the light beam from the LED is applied from the side surface wall portion of the light guide plate, the light beam from the LED reaches the display portion via the light refracting portion made of a grain, a dot, or the like and provided in the surface portion of the light guide plate facing the LCD indicator control substrate, so that surface uniformity of light led to the display portion can be achieved.

In the above aspect, a white reflective surface portion may be formed at a portion in the LCD indicator control substrate facing the light guide plate.

Accordingly, by an action of the white reflective surface portion, a light amount emitted from a surface of the light guide plate facing the reflective plate to the display portion is increased, and displayed characters displayed in the display portion can be clearer.

In the above aspect, the white reflective surface portion may be configured by attaching a film sheet onto the LCD indicator control substrate.

According to such a configuration, with the white reflective surface portion being configured by the film sheet, even when the light beam of the LED is efficiently led to the display portion, a demand for downsizing the entire device can be met.

In one mode of the above aspect, the white reflective surface portion maybe configured by printing it on the LCD indicator control substrate.

According to such a configuration, with the white reflective surface portion being configured by printing it on the LCD indicator control substrate, even when the light beam of the LED is efficiently led to the display portion, the demand for downsizing the entire device can be met.

Effect of the Invention

In this invention configured as above, the light beam of the LED mounted on the outer peripheral portion of the LCD indicator control substrate is caused to enter from the side of the side wall surface portion of the light guide plate, and then is guided to the side of the light guide surface portion of the light guide plate facing the diffusion sheet and led to the side of the LCD indicator, to radiate the display portion. As a result, the reaching radiation distance of the light beam emitted by the LED to the display portion is extended, so that the spot light effect is reduced. Thus, the thin diffusion sheet having high transmissibility with the advantage in terms of the cost can be adopted. Therefore, this invention can reduce the number of the LEDs to be used by using LEDs having a high brightness with a high light intensity, and as a result, the downsizing of the entire device is achieved, and further the assembly time is consequently reduced.

EMBODIMENT FOR CARRYING OUT THE INVENTION

An embodiment of this invention is configured so as to achieve an increase in an average light amount radiated to an LCD indicator by LEDs and reduction of a spot light effect at the same time while also sufficiently responding to a demand for downsizing.

Figure 1:
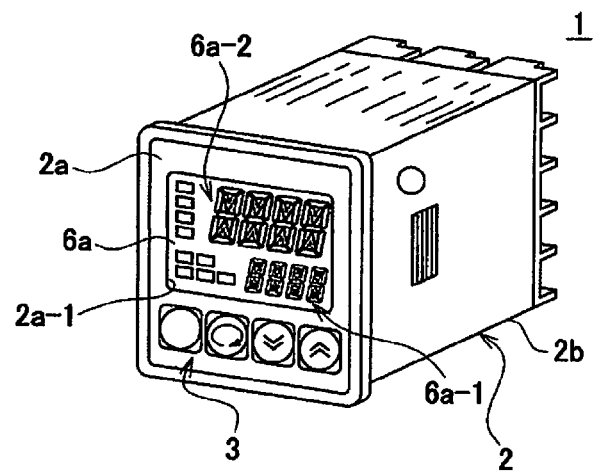
FIG. 1 is a perspective view showing a general temperature controller serving as an electronic equipment provided with a display portion, viewed toward the side with the display portion.

Next, one embodiment according to the present invention will be described with reference to the drawings, where configurations corresponding to the above conventional art will be given the same symbols. Firstly, an outer appearance configuration of a general temperature controller will be described with reference to FIG. 1. In a temperature controller 1 serving as an electronic equipment, a display region portion 6a serving as a display portion for displaying a set temperature value and the like, or a plurality of operation buttons 3 for operating a control unit and the like is disposed in a front surface portion of an electronic equipment casing 2, and an LCD indicator unit 10 (FIG. 4) and the like, described later, are accommodated in the electronic equipment casing 2.

Figure 2:
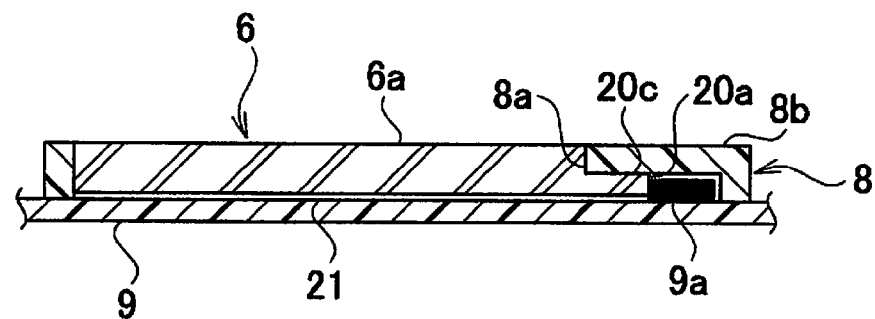
FIG. 2 is a laterally sectional view according to one embodiment of the temperature controller serving as the electronic equipment provided with the display portion according to this invention.

As shown in FIG. 2, the temperature controller 1 is configured to have the electronic equipment casing 2 formed of a front case 2a and a rear case 2b, having a front surface and formed into a horizontally long rectangular parallelepiped for example. In a front surface portion of the front case 2a, a display window 2a-1 formed of an opened window, with a closed window closing the opened window with transparent resin, and the like, is provided. A display window cover 4 formed into a frame shape and having a display window portion made of transparent resin is attached. A support frame body 2a-2 is formed so as to extend on the rear portion side of the front case 2*a*. In the support frame body 2*a*-2, a display sheet 5 having a center portion formed of an opened window, a closed window closing the opened window with transparent resin, and the like, an LCD indicator 6, a diffusion sheet 7, a reflective frame body 8, and an LCD indicator control substrate 9 in which LEDs 9*a* serving as backlight sources for the LCD indicator 6 and a control circuit for performing LCD drive control, temperature adjustment control, and the like are mounted and are successively fitted and disposed side by side from the back surface side of the front surface portion of the front case 2*a* to the rear side, so as to configure the LCD indicator unit 10. The display region portion 6*a* of the LCD indicator 6 (FIGS. 2 and 4) is disposed to be exposed from the display window 2*a*-1 (FIG. 3) to an exterior. The LCD indicator control substrate 9 and the LCD indicator 6 provide an electric interface via a pair of upper and lower rubber connectors 11 disposed in the front case 2*a*.

Figure 4:
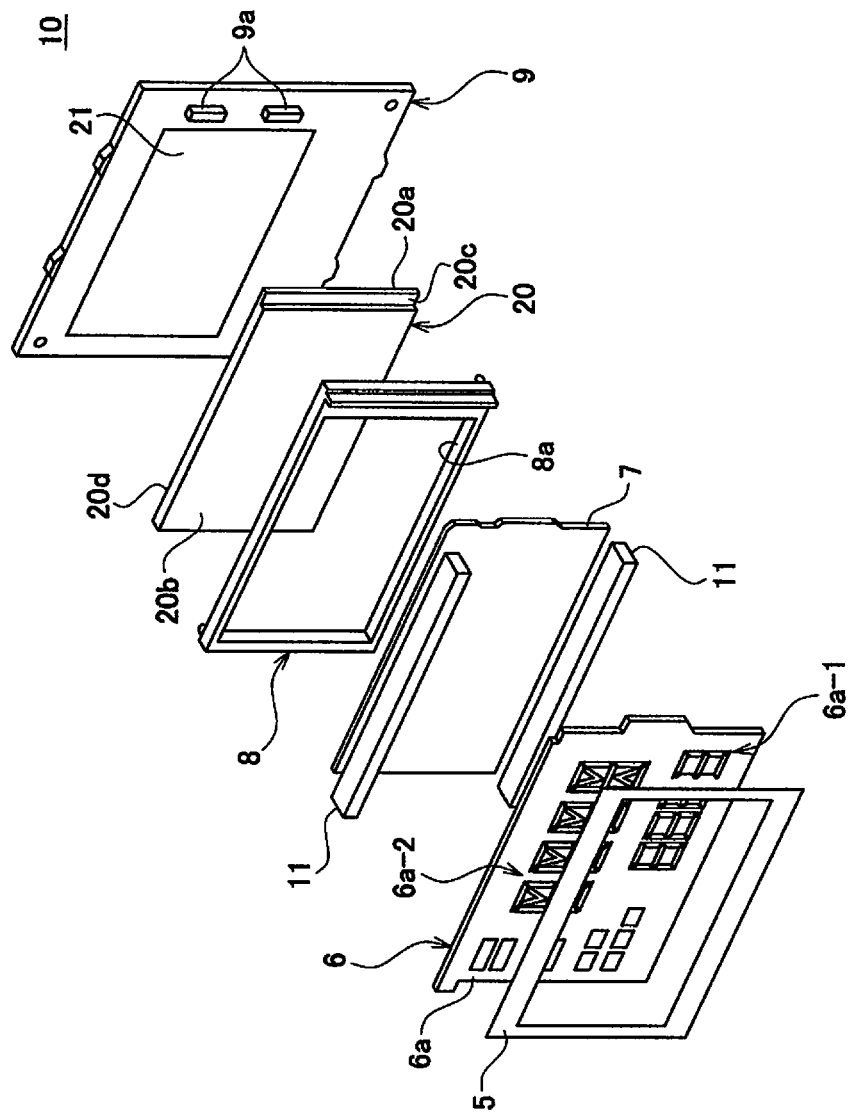
FIG. 4 is an exploded perspective view showing details of the LCD indicating unit in FIG. 3

With reference to FIG. 4, an entire shape of the LCD indicator control substrate 9 is a substantially regular square, for example. In a right-side outer peripheral portion on the front surface side in an outer peripheral portion thereof, a pair of LEDs 9*a* is mounted side by side so as to have a small gap in-between in a vertical row. It should be noted that although the LEDs 9*a* are mounted on the right-side portion of the LCD indicator control substrate 9 in this embodiment, the present invention is not limited to this but the LEDs may sometimes be mounted on a left-side outer peripheral portion, an upper-side outer peripheral portion, or a lower-side outer peripheral portion on the front surface side in the outer peripheral portion of the LCD indicator control substrate 9.

The reflective frame body 8 is formed into a frame shape so as to have an opening wall 8*a*, and the opening wall 8*a* is white-colored. A light guide plate 20 made of a transparent synthetic resin plate of acryl, polycarbonate, or the like is installed on the rear surface side of the reflective frame body 8 for example in an engaged state. As a result, the front surface side of an outer peripheral portion of the light guide plate 20 is covered with the reflective frame body 8, and the LCD indicator control substrate 9 is disposed on the rear surface side of the light guide plate 20. Therefore, a light beam emitted from the LEDs 9*a* is caused to enter an interior of the light guide plate 20 from a side wall surface portion 20*a*, and reach a light guide surface portion 20*b* facing the LCD indicator 6 with surface uniformity of the light by a light refracting portion made of a grain, a dot, or the like and formed in a surface portion 20*d* of the light guide plate 20 facing the LCD indicator control substrate 9, to radiate the display region portion 6*a* serving as the display portion of the LCD indicator 6 via the diffusion sheet 7.

At this time, the light beam escaping from the outer peripheral portion side of the light guide plate 20 to the exterior is guided to the side of the light guide plate 20 by the white-colored opening wall 8*a* of the reflective frame body 8. It should be noted that as described above, a laterally radiating type of LEDs 9*a* are used in order to radiate the side wall surface portion of the light guide plate 20 in a state where the LEDs are mounted on the LCD indicator control substrate 9.

A white reflective surface portion 21 is formed in the LCD indicator control substrate 9 so as to face the light guide plate 20. The white reflective surface portion 21 is configured by attaching a film sheet onto the LCD indicator control substrate 9, or by printing it on the LCD indicator control substrate 9, so as to guide the light beam escaping from the light guide plate 20 to the side of the LCD indicator control substrate 9 to the side of the light guide plate 20 again.

Further, it is thought that direct light is applied from a side end surface portion 20*c* of the light guide plate 20 facing the LEDs 9*a* to the diffusion sheet 7 and the like. However, in order not to leak out such direct light, as shown in FIG. 4, the side wall surface portion 20*c* of the light guide plate 20 faces a side wall portion 8*b* (FIGS. 2 and 3) of the reflective frame body 8 so as to block the direct light in this embodiment.

Figure 3:
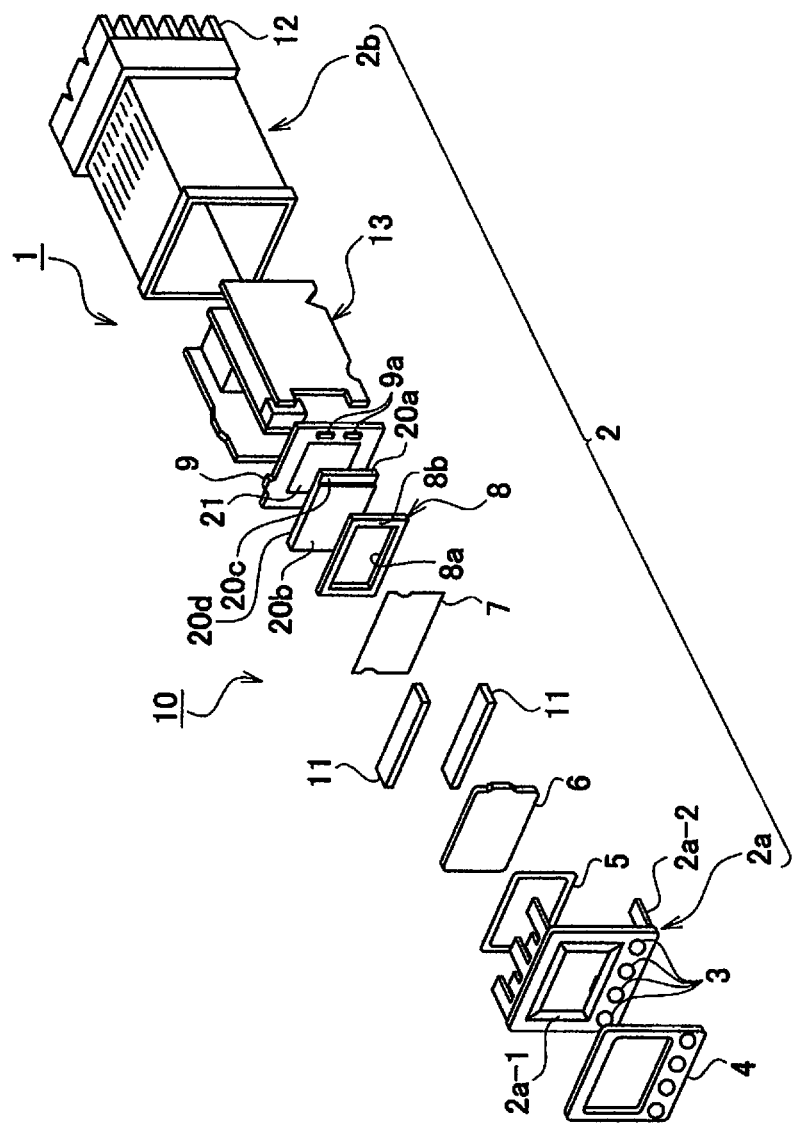
FIG. 3 is an exploded, enlarged perspective view showing major components of the temperature controller in FIG. 2 including an LCD indicator unit.

With further reference to FIGS. 3 and 4, the rear case 2*b* has a box shape in which a front surface portion and a rear surface portion are opened, a terminal base 12 to be electrically connected to an external device is installed in a rear opening in a protruding manner, and a control unit substrate group 13 for controlling the external device via the terminal base 12 is accommodated inside. In the rear case 2*b*, the LCD indicator unit 10 is accommodated and installed so as to provide an electric interface with the control unit substrate group 13.

The temperature controller 1 configured in such a way is installed in a control panel or the like and assembled in a factory or the like. By operating the operation buttons 3 provided in the front surface portion of the front case 2*a*, a set temperature is digitally displayed in a set temperature display portion 6*a*-1 in the display region portion 6*a* of the LCD indicator 6. At the same time, a current temperature indicating a heating state in the external device, such as a heating processing device operated based on such a set temperature, is digitally displayed in a current temperature display portion 6*a*-2 in the display region portion 6*a*.

Digital display of the set temperature display portion 6*a*-1 and the current temperature display portion 6*a*-2 in the display region portion 6*a* is performed by control of the LCD indicator control substrate 9 disposed on the rear portion side of the LCD indicator 6, with the LCD indicator control substrate similarly configuring the LCD indicator unit 10. That is, in the LCD indicator unit 10, an operation signal of the operation buttons 3 is firstly received by the LCD indicator control substrate 9, the set temperature is digitally expressed by the LCD indicator 6, and displayed characters of the set temperature display portion 6*a*-1 in the display region portion 6*a* are transparently displayed by illumination of the LEDs 9*a*, so that the set temperature is digitally displayed. Similarly, in a case where a current temperature signal indicating the heating state of an item, such as a heat plate in the external device, is received by the LCD indicator control substrate 9 via the control unit substrate group 13, the current temperature is digitally expressed by the LCD indicator 6, and the displayed characters are transparently displayed by the illumination of the LEDs 9*a* in the current temperature display portion 6*a*-2 of the display region portion 6*a*, so that the current temperature is digitally displayed.

In such a way, in order to make the LCD indicator 6 clearly display the set temperature and the current temperature in the display region portion 6*a*, the temperature controller 1 is required to include backlight means for illuminating a rear surface of the LCD indicator 6. As such backlight means, in the embodiment configured as above, the light beam emitted by the LEDs 9*a* mounted on the LCD indicator control substrate 9 is caused to enter from the side wall surface portion 20*a* on one short side of the light guide plate 20 and reach the light guide surface portion 20*b*. As a result, by actions of the diffusion sheet 7 and the white opening wall 8*a* in the reflective frame body 8, the illumination light by the LEDs 9*a* illuminates the LCD indicator 6 and transparently displays the displayed characters in the display region portion 6*a*, so that a worker can visually recognize the displayed characters.

In the above embodiment, white light LEDs 9*a* are used, so that illumination intensity is increased more than when other colors are used even with the same current value, and the displayed characters of the display region portion 6*a* can be clearly displayed. However, the present invention is not limited to this and color LEDs of red, green, or the like can also be used.

In general, in the temperature controller 1 and the like, the characters displayed in the set temperature display portion 6a-1 are green and the characters displayed in the current temperature display portion 6a-2 are red in the display region portion 6a. However, in order to respond to such a demand for display clarity, and as a modified example of this embodiment, upper and lower half portions of the diffusion sheet 7 are colored differently from each other, where the upper half portion is red-colored (for displaying the current temperature), and the lower half portion is green-colored (for displaying the set temperature). As another modified example, the pair of upper and lower LEDs 9a is colored differently from each other by making the upper LED a red light (for displaying the current temperature) and making the lower LED a green light (for displaying the set temperature). In this case, by providing a partition wall portion in the reflective frame body 8, the displayed characters can be displayed in the display region portion 6a without mixing up both the colors.

Next, regarding the light guide surface portion 20b in the light guide plate 20, one embodiment of a specific configuration for achieving the surface uniformity of the light in consideration with an optical characteristic will be described with reference to FIGS. 5 and 6. Firstly, in a case where the light entering from the side wall surface portion 20a (FIGS. 2-4) of the light guide plate 20 (FIG. 4) is incident on an interface at an incidence angle R as a basic optical characteristic as in FIG. 5, the light is totally reflected and not transmitted to an exterior from the interface with the incidence angle R being larger than a critical angle regulated by a material of the light guide plate. Thus, in a case where the surface portion 20d and the upper surface 20b are made of smooth surfaces without any convex and/or concave parts, the light advances inside the light guide plate while going back and forth between the surface portion 20d and the upper surface 20b. As a result, an amount of the light transmitted to the exterior on the side of the upper surface 20b is decreased.

Figure 5:
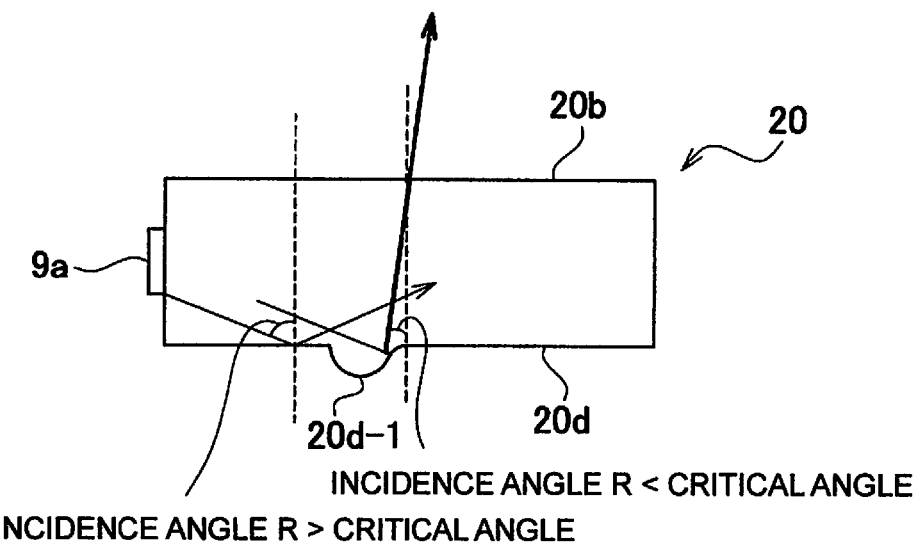
FIG. 5 is a view showing a light beam applied from a LED together with the LED from the side of a surface portion of a light guide plate facing an LCD indicator control substrate, in which a dot serving as one embodiment according to this invention achieved in order to efficiently guide the light beam from a side wall surface portion of the light guide plate to the side of a light guide surface portion is formed.
Figure 6:
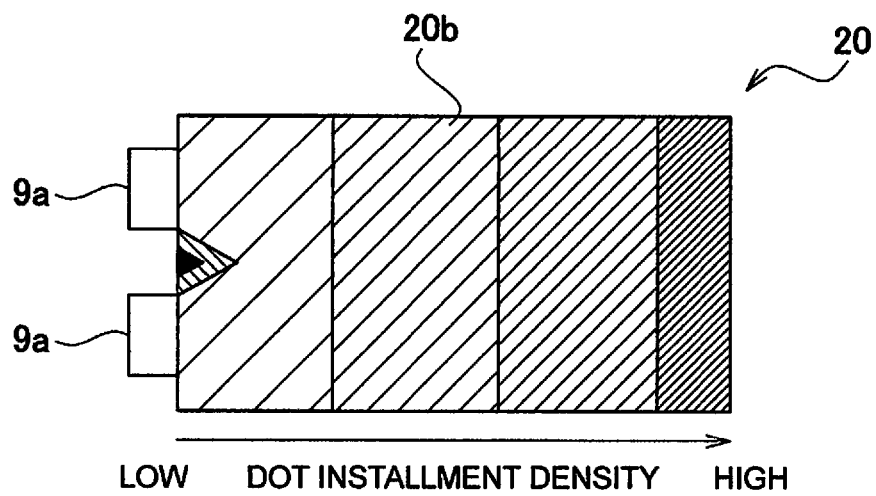
FIG. 6 is a view for illustrating a setting mode of installment density of the dots formed in the surface portion of the light guide plate facing the LCD indicator control substrate shown in FIG. 5.
Figure 7:
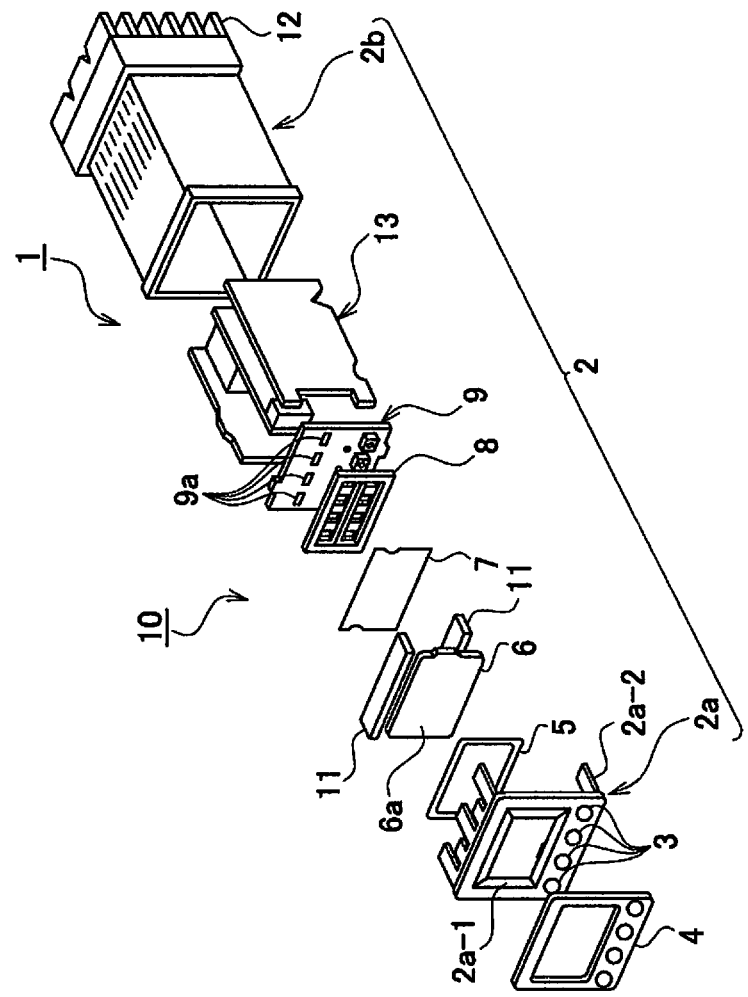
FIG. 7 is an exploded perspective view showing a temperature controller serving as a conventional electronic equipment provided with a display portion.

By providing dots 20d-1 in the surface portion 20d facing the LCD indicator control substrate 9 as shown in FIG. 5 so as to generate the light with the incidence angle R being smaller than the critical angle to the upper surface 20b, the light is transmitted to the exterior on the side of the upper surface 20b. The light transmitted to the exterior on the side of the upper surface 20b can be adjusted by an amount (density per unit area) of convex and/or concave parts of the dots 20d-1 provided in the surface portion 20d. In order to create a uniform light transmitted to the exterior on the side of the upper surface 20b, as in FIG. 6, the amount of the convex and/or concave parts is decreased (the density per unit area is decreased) on the side closer to the LEDs where the light amount is high, and the amount of the convex and/or concave parts is increased (the density per unit area is increased) on the side more distant from the LEDs where the light amount is low and between the LED and the LED, so that optimization can be performed.

With the above embodiment according to this invention configured as above, and with reference back to FIG. 4, the light beam of the LEDs 9a mounted on the outer peripheral portion of the LCD indicator control substrate 9 is caused to enter from the side of the side wall surface portion 20a on the one short side of the light guide plate 20, and then expand to the side of the light guide surface portion 20b of the light guide plate 20 facing the reflective frame body 8 and led to the side of the LCD indicator 6, to radiate the display region portion 6a serving as the display portion. As a result, a reaching radiation distance of the light beam emitted by the LEDs 9a to the display region portion 6a is extended, so that the spot light effect can be reduced. Thus, the thin diffusion sheet 7 having high transmissibility with an advantage in terms of cost can be adopted. Therefore, in this embodiment, the number of the LEDs 9a to be used can be reduced by using the LEDs having a high brightness with a high light intensity, and as a result, downsizing of the entire device can be achieved, and further assembly time is consequently reduced.

Since the LEDs 9a in the above embodiment according to this invention radiate the side wall surface portion 20a on the one short side of the light guide plate 20, the reaching distance of the light beam emitted from the LEDs 9a to the display region portion 6a serving as the display portion can be extended, so that the spot light effect can be reduced as a result. Use of LEDs having a high brightness with a high light intensity contributes to a further reduction of the number of the LEDs 9a to be used.

In the above embodiment according to this invention, the light refracting portion made of the dots 20d-1 or the like is provided in the surface portion 20d of the light guide plate 20 (FIG. 5) facing the LCD indicator control substrate 9 (FIG. 4). Thus, the surface uniformity of the light to the light guide surface portion 20b of the light guide plate 20 is achieved. It should be noted that in order to achieve the surface uniformity of the light to such a light guide surface portion 20b, the light refracting portion made of the dots 20d-1 or the like may be provided in a surface portion configuring the light guide plate other than the surface portion 20d facing the LCD indicator control substrate 9.

Further, in the above embodiment according to this invention, the white reflective surface portion 21 is formed at a portion of the LCD indicator control substrate 9 facing the light guide plate 20. Thus, by an action of the white reflective surface portion 21, the light amount emitted from the light guide surface portion 20b serving as a surface portion of the light guide plate 20 facing the reflective frame body 8 to the display region portion 6a serving as the display portion is increased, so that the characters displayed in the display region portion 6a can be clearer.

In the above embodiment according to this invention, the white reflective surface portion is configured by attaching the film sheet onto the LCD indicator control substrate, or configured by printing it on the LCD indicator control substrate 9. Thus, even when the light beam of the LEDs 9a is efficiently led to the display region portion 6a serving as the display portion, the demand of downsizing the entire device can be met.

INDUSTRIAL APPLICABILITY

As described above, this invention is capable of achieving an increase in the average light amount applied to the LCD indicator by the LEDs and the reduction of the spot light effect at the same time, and is also sufficiently responsive to the demand for downsizing. Thus, the invention is favorable for electronic equipment or the like provided with a display portion such as a temperature controller, a timer, or a digital panel meter.

DESCRIPTION OF SYMBOLS

1 Temperature controller
2 Electronic equipment casing
2a Front case
2a-1 Display window
2a-2 Support frame body 2b Rear case
4 Display portion cover
6 LCD indicator
6a Display region portion (display portion)
6a-1 Set temperature display portion
6a-2 Current temperature display portion
7 Diffusion sheet
8 Reflective frame body
8b Side wall portion
9 LCD indicator control substrate
9a LED
10 LCD indicator unit
20 Light guide plate
20a Side wall surface portion
20b Light guide surface portion
20c Side end portion
20d Surface portion facing LCD indicator control substrate 9
20d-1 Dot (light refracting portion)
21 White reflective surface portion

The invention claimed is:

1. An electronic equipment provided with a display portion, configured to accommodate an LCD indicator unit in an electronic equipment casing formed of a front case and a rear case, and dispose the display portion of the LCD indicator unit to be exposed from a front opening provided in the front case, wherein the LCD indicator unit is configured to have an LCD indicator provided with the display portion, a diffusion sheet disposed on a rear surface side of the LCD indicator, a reflective frame body disposed on a rear surface side of the diffusion sheet, a light guide plate disposed on a rear surface side of the reflective frame body such that an outer peripheral portion thereof is covered with the reflective frame body, and an LCD indicator control substrate disposed on a rear surface side of the light guide plate, and is configured such that an LED as a light source for the LCD indicator is mounted on an outer peripheral portion of the LCD indicator control substrate, and light emitted from the LED is caused to enter a side wall surface portion of the light guide plate to radiate the display portion of the LCD indicator.

2. The electronic equipment provided with the display portion according to claim 1, wherein a surface portion of the light guide plate facing the LCD indicator control substrate comprises a light refracting portion.

3. electronic equipment provided with the display portion according to claim 1, wherein a portion in the LCD indicator control substrate facing the light guide plate comprises a white reflective surface portion.

4. The electronic equipment provided with the display portion according to claim 3, wherein the white reflective surface portion is configured by attaching a film sheet onto the LCD indicator control substrate.

5. The electronic equipment provided with the display portion according to claim 3, wherein the white reflective surface portion is configured by printing it on the LCD indicator control substrate.

6. The electronic equipment provided with the display portion according to claim 2, wherein the light refracting portion comprises one selected from the group of a grain and a dot, formed in the surface portion of the light guide plate.

7. An electronic equipment comprising:
an electronic equipment casing formed of a front case and a rear case,
a display portion configured to accommodate an LCD indicator unit and disposed to be exposed from a front opening in the front case,
an LCD indicator unit having an LCD indicator unit display portion with an LCD indicator, and disposed so that the display portion of the LCD indicator unit is exposed from a front opening in the front case,
a diffusion sheet disposed on a rear surface side of the LCD indicator,
a reflective frame body disposed on a rear surface side of the diffusion sheet,
a light guide plate with a side wall surface portion, disposed on a rear surface side of the reflective frame body such that an outer peripheral portion of the light guide plate is covered with the reflective frame body, and
an LCD indicator control substrate disposed on a rear surface side of the light guide plate, with an LED as a light source mounted on an outer peripheral portion of the LCD indicator control substrate,
wherein light emitted from the LED is caused to enter the side wall surface portion of the light guide plate to radiate the display portion of the LCD indicator.

8. An LCD indicator unit provided with a display portion with an LCD indicator, comprising:
a diffusion sheet disposed on a rear surface side of the LCD indicator,
a reflective frame body disposed on a rear surface side of the diffusion sheet,
a light guide plate with a side wall surface portion, disposed on a rear surface side of the reflective frame body such that an outer peripheral portion of the light guide plate is covered by the reflective frame body, and
an LCD indicator control substrate disposed on a rear surface side of the light guide plate, with an LED as a light source mounted on an outer peripheral portion of the LCD indicator control substrate,
wherein light emitted from the LED is caused to enter the side wall surface portion of the light guide plate to illuminate the display portion of the LCD indicator.

* * * * *